(12) United States Patent
Moon et al.

(10) Patent No.: US 8,633,631 B2
(45) Date of Patent: Jan. 21, 2014

(54) PIEZOELECTRIC MOTOR

(75) Inventors: Chan-young Moon, Siheung-si (KR); Woo-jong Cho, Suwon-si (KR); Mun-cheol Choi, Hwaseong-si (KR); Du-seung Oh, Suwon-si (KR); Dong-eui Shin, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 13/039,430

(22) Filed: Mar. 3, 2011

(65) Prior Publication Data

US 2011/0221305 A1 Sep. 15, 2011

(30) Foreign Application Priority Data

Mar. 9, 2010 (KR) .......... 10-2010-0021009

(51) Int. Cl.
*H02N 2/00* (2006.01)

(52) U.S. Cl.
USPC .................................. 310/323.05

(58) Field of Classification Search
USPC ............ 310/323.05, 323.01, 323.02, 323.03, 310/323.04, 323.14, 323.15, 323.06, 310/323.07, 323.09
IPC .................................. H01L 41/08; H02N 2/00
See application file for complete search history.

(56) References Cited

U.S. PATENT DOCUMENTS

| | | | | |
|---|---|---|---|---|
| 4,736,129 | A * | 4/1988 | Endo et al. | 310/323.11 |
| 4,959,579 | A * | 9/1990 | Kuwabara et al. | 310/323.09 |
| 5,335,115 | A | 8/1994 | Kawai et al. | |
| 6,288,848 | B1 | 9/2001 | Shinohara et al. | |
| 8,487,512 | B2 * | 7/2013 | Kanazawa | 310/323.04 |

* cited by examiner

*Primary Examiner* — Thomas Dougherty
*Assistant Examiner* — Karen B Addison
(74) *Attorney, Agent, or Firm* — Drinker Biddle & Reath LLP

(57) ABSTRACT

A piezoelectric motor including a base member; a stator disposed on the base member and comprising at least one piezoelectric element; a rotor configured to rotate by a wave motion of the stator, the wave motion being generated by the piezoelectric element; a cover member attached to the base member; a bearing arranged between the cover member and the rotor; and an elastic member configured to press the rotor toward the stator.

18 Claims, 12 Drawing Sheets

PIEZOELECTRIC MOTOR

CROSS-REFERENCE TO RELATED PATENT APPLICATIONS

This application claims the benefit of Korean Patent Application No. 10-2010-0021009, filed on Mar. 9, 2010, in the Korean Intellectual Property Office, the entire disclosure of which is incorporated herein by reference.

BACKGROUND

1. Field of the Invention

The invention is a piezoelectric motor and method of operation thereof, and more particularly, a piezoelectric motor having an elastic member for pressing a rotor against a piezoelectric element or an element driven by the piezoelectric element.

2. Description of the Related Art

The piezoelectric motor is a new type of motor that does not require a magnet or coil winding. A piezoelectric motor is a motor having a piezoelectric element that is driven by a high frequency voltage. The piezoelectric element vibrates in response to the high frequency voltage and the vibration is used to drive the rotor.

The piezoelectric motor needs to be compact and reliable to be used in portable electronic devices.

SUMMARY

Therefore, there is a need in the art for a piezoelectric motor including a base member; a stator disposed on the base member and comprising at least one piezoelectric element; a rotor configured to rotate by a wave motion of the stator, the wave motion being generated by the piezoelectric element; a cover member attached to the base member; a bearing arranged between the cover member and the rotor; and an elastic member configured to press the rotor toward the stator.

A plurality of operation protrusions may be formed on the stator and a part of the rotor is configured to contact the operation protrusions.

The piezoelectric motor may include stator installation member for attaching the stator onto the base member.

A plurality of operation protrusions may be formed on the stator, and a part of the stator installation member may be inserted in a space between the operation protrusions, and the other part of the stator installation member may be fixed to the base member.

A coupling groove may be formed in the stator and a coupling protrusion formed on the base member may be configured to couple with the coupling groove.

A coupling protrusion may be formed on the stator and a coupling groove formed in the base member may be configured to couple with the coupling protrusion.

A mounting groove may be formed in the base member and a mounting protrusion formed on the cover member may be configured to couple to the mounting groove.

A mounting groove may be formed in the cover member and a mounting protrusion may be formed on the base member and configured to couple with the mounting groove.

At least one pressure control member may be arranged between the cover member and the bearing.

At least one pressure control hole may be formed in the cover member and a pressure control bolt may be installed in the pressure control hole.

The elastic member may be arranged between the cover member and the bearing.

The elastic member may be a leaf spring having a ring shape.

The elastic member may include a cover member installation portion configured to be installed onto the cover member; a base member installation portion configured to be installed onto the base member; and a middle portion configured to connect the cover member installation portion with the base member installation portion.

The cover member installation portion and the base member installation portion may be configured to elastically deform during installation of the elastic member, and the elastic member may be configured to operate an elastic force in a direction to decrease the distance between the cover member installation portion and the base member installation portion.

An installation protrusion may be formed on at least one of the cover member installation portion and the base member installation portion.

A piezoelectric motor is disclosed. The piezoelectric motor may include a base member comprising a cover member; a stator disposed on the base member and comprising at least one piezoelectric element; a rotor configured to rotate by a wave motion of the stator, the wave motion being generated by the piezoelectric element; a bearing arranged between the cover member and the rotor; and an elastic member configured to urge the rotor toward the stator.

The cover member may be installed onto the base member.

A method of rotating a rotor is disclosed. The method including applying an electrical current to a piezoelectric element supported by a base member causing the piezoelectric element to move in a wave motion; pressing the rotor towards the piezoelectric element with the force from an elastic member, wherein the force acts between a cover above the base and the base and wherein the force presses on a bearing arranged between the cover member and the base, and wherein the bearing rotates in response to the rotor rotating.

The piezoelectric element may be a circular ring shape.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
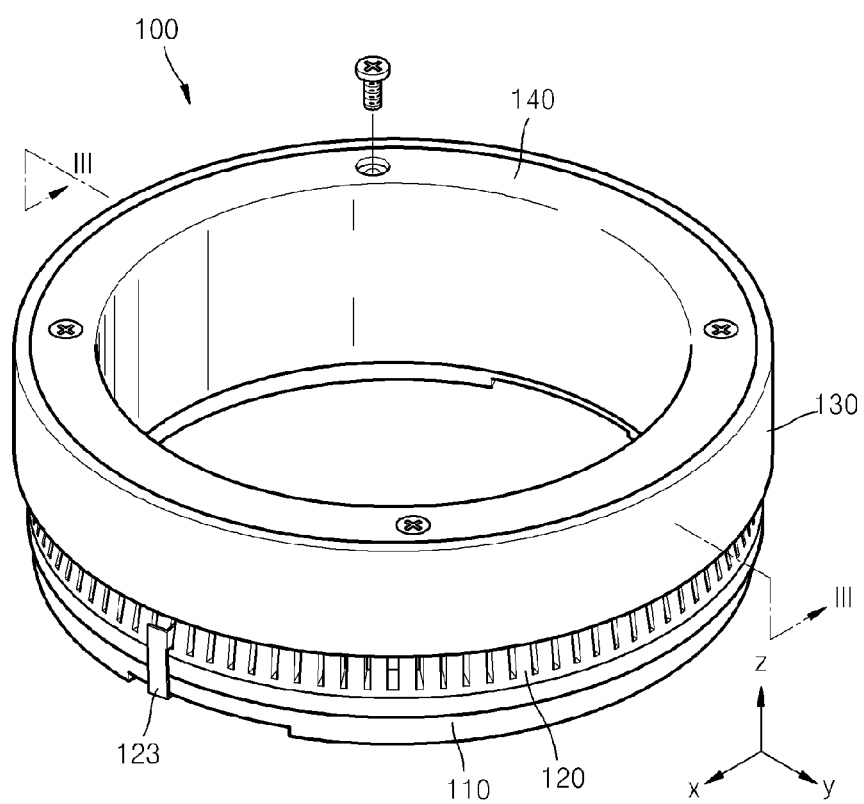
FIG. 1 is a perspective view of a piezoelectric motor according to an embodiment of the invention.

The attached drawings for illustrating exemplary embodiments of the invention are referred to in order to understanding of the invention, the merits thereof, and the objectives accomplished by the implementation of the invention. Hereinafter, the invention will be described in detail by explaining exemplary embodiments of the invention with reference to the attached drawings. Like reference numerals in the drawings denote like elements.

First Embodiment

Figure 2:
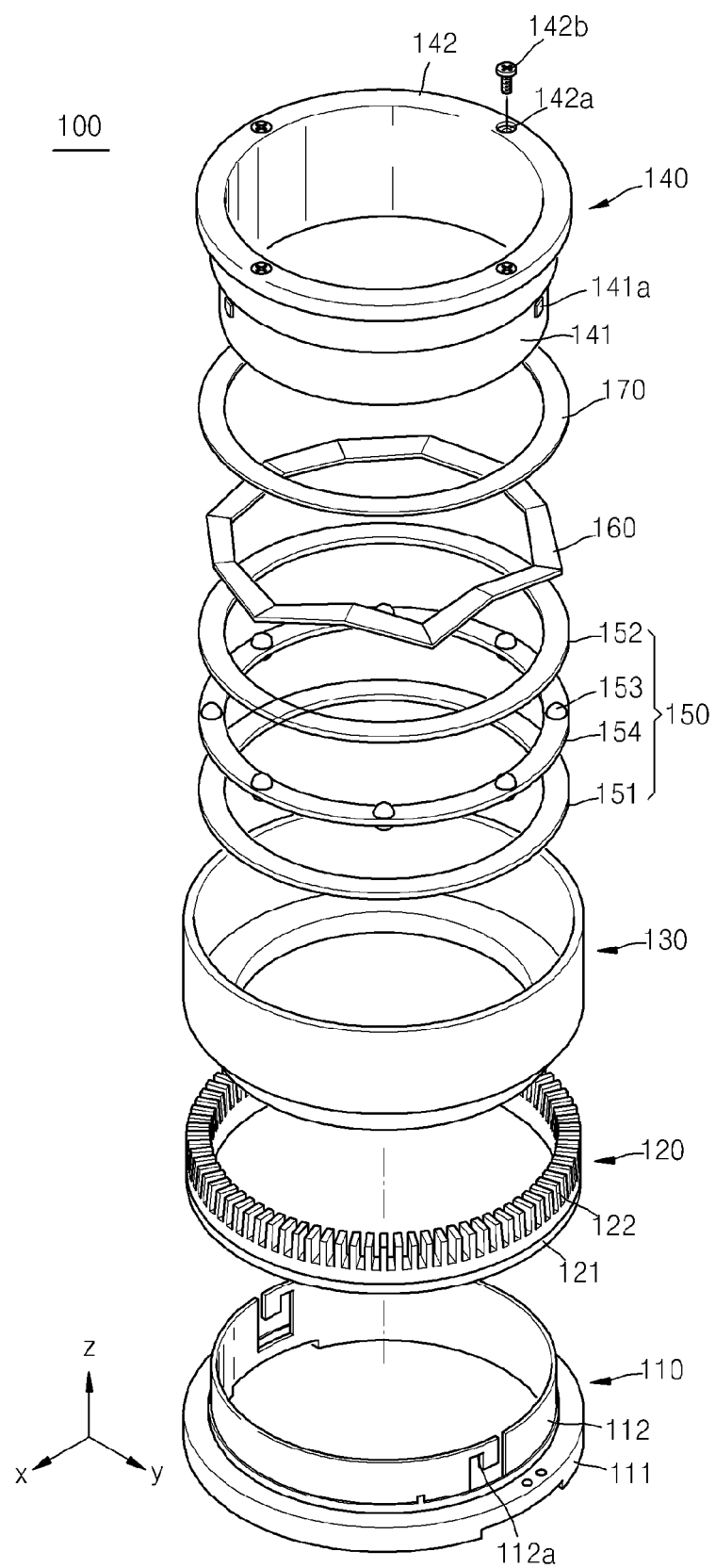
FIG. 2 is an exploded perspective view of a piezoelectric motor of FIG. 1.
Figure 3:
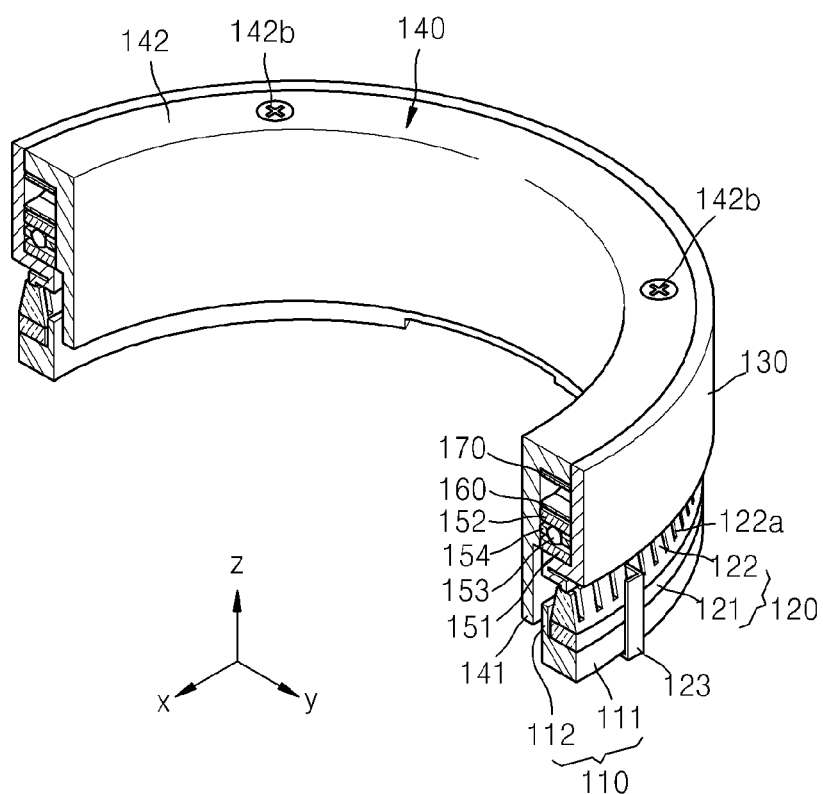
FIG. 3 is a cross-sectional view taken along a line III-III of FIG. 1.
Figure 4:
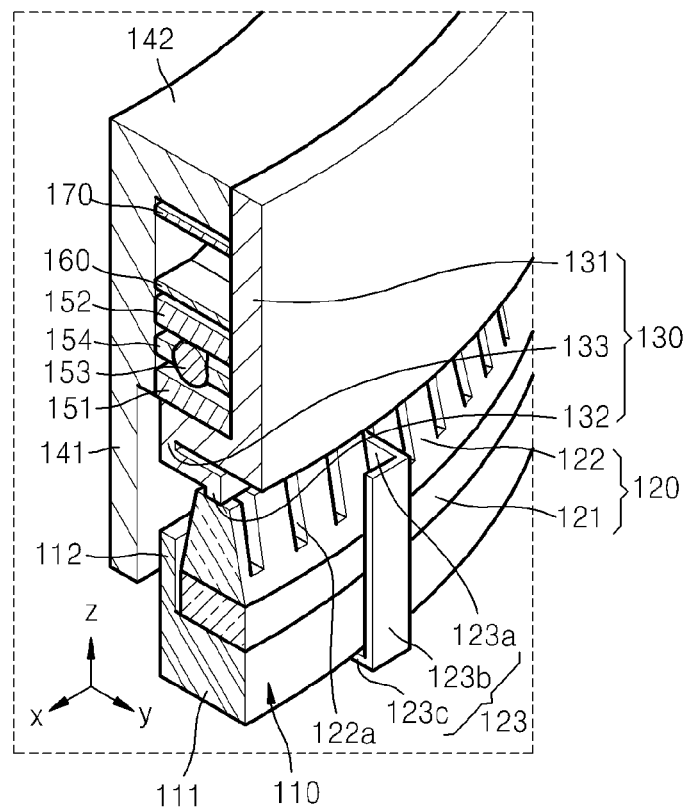
FIG. 4 is an enlarged view of a portion of the piezoelectric motor of FIG. 3.
Figure 5:
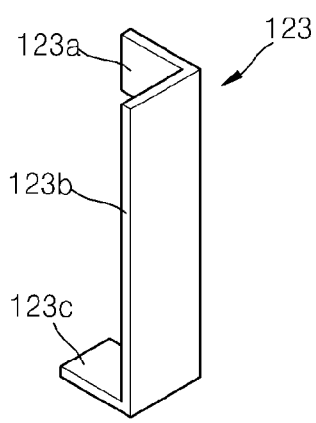
FIG. 5 is a perspective view of a stator installation member according to an embodiment of the invention.
Figure 6:
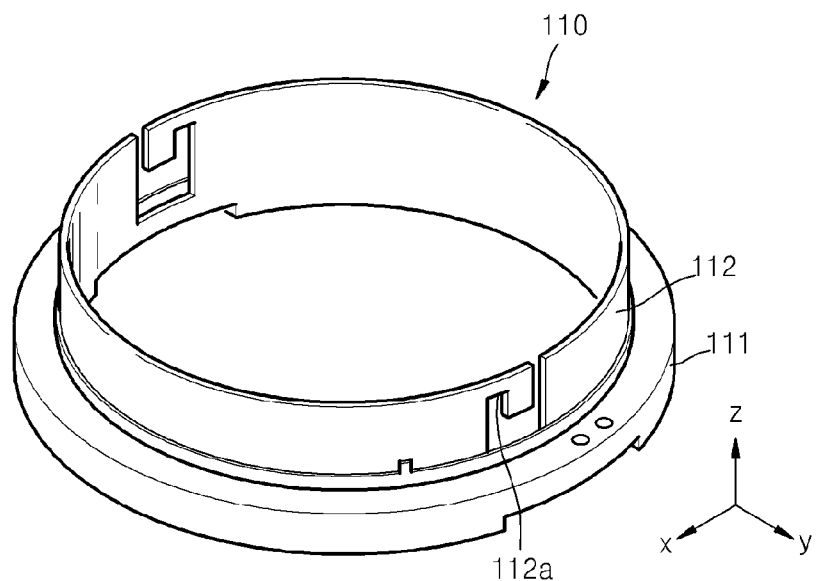
FIG. 6 is a perspective view of a base member according to an embodiment of the invention.
Figure 7:
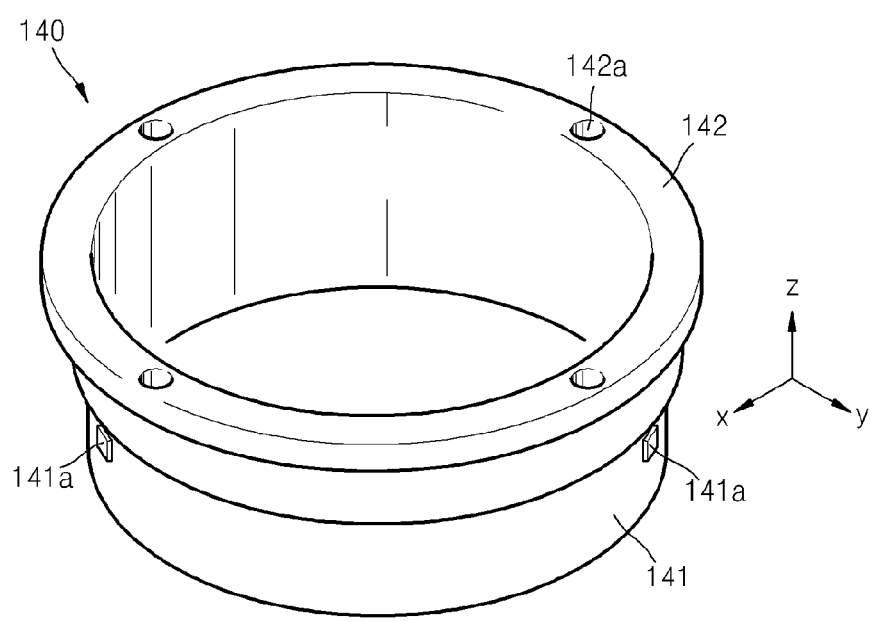
FIG. 7 is a perspective view of a cover member according to an embodiment of the invention.
Figure 8:
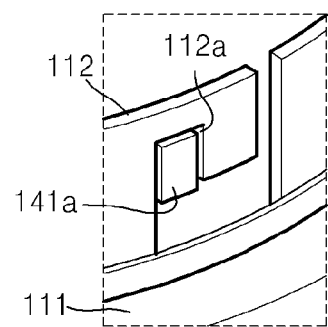
FIG. 8 is a perspective view illustrating a mounting protrusion of the cover member inserted in a coupling groove of the base member, according to an embodiment of the invention.

FIG. 1 is a perspective view of a piezoelectric motor 100 according to an embodiment of the invention. FIG. 2 is an exploded perspective view of the piezoelectric motor 100 of FIG. 1. FIG. 3 is a cross-sectional view taken along a line III-III of FIG. 1. FIG. 4 is an enlarged view of a portion of the piezoelectric motor of FIG. 3. FIG. 5 is a perspective view of a stator installation member 123 according to an embodiment of the invention. FIG. 6 is a perspective view of a base member 110 according to an embodiment of the invention. FIG. 7 is a perspective view of a cover member 140 according to an embodiment of the invention. FIG. 8 is a perspective view illustrating a mounting protrusion 141a of the cover member 140 inserted in a mounting groove 112a of the base member 110, according to an embodiment of the invention.

Referring to FIGS. 1-4, the piezoelectric motor 100 according to the current embodiment includes the base member 110, a stator 120, a rotor 130, the cover member 140, a bearing 150, an elastic member 160, and a pressure control member 170.

Referring to FIGS. 2 and 6, the base member 110 has a circular ring shape. The base member 110 includes a support portion 111 where the stator 120 is arranged, and an extending portion 112 extending from the support portion 111 toward the cover member 140. The mounting groove 112a is formed in the extending portion 112 and the cover member 140 may be installed onto the base member 110 via the mounting groove 112a.

The stator 120 has a circular ring shape and includes a piezoelectric element 121 on one surface thereof and a plurality of operation protrusions 122 on another surface which is opposite to the surface on which the piezoelectric element is disposed. The piezoelectric element 121 has a circular ring shape and is divided into a plurality of polarized portions that are electrically polarized. A main expansion/contraction direction of each polarized portion of the piezoelectric element 121 is the same as a direction of polarization. The polarization direction of each polarized portion of the piezoelectric element 121 is arranged to be perpendicular to a rotation surface of the rotor 130.

Although the piezoelectric element 121 of the current embodiment includes a single piezoelectric ceramic layer, that is, a mono-layered piezoelectric ceramic, the invention is not limited thereto. In other words, the piezoelectric element according to the invention may have a structure in which a plurality of piezoelectric ceramic layers are deposited.

The operation protrusions 122 of the stator 120 protrude toward the rotor 130 to form a contact frictional surface between the stator 120 and the rotor 130. The operation protrusions 122 amplify a curved wave generated by the piezoelectric element 121. The movement of each of the operation protrusions 122 follows an oval motion track. That is, the operation protrusions 122 which participate in forming consecutive curved waves follow an oval motion track. Also, points of the operation protrusions 122 having positional differences have phase differences from each other and follow the oval motion track, thereby forming consecutive curved waves.

The stator 120 is installed at the base member 110 by using the stator installation member 123 in the current embodiment. Referring to FIG. 5, the stator installation member 123 includes a hook portion 123a, a connection portion 123b, and an installation portion 123c. The hook portion 123a is inserted in a groove 122a between the operation protrusions 122. The installation portion 123c is fixed to the base member 110. The connection portion 123b connects the hook portion 123a and the installation portion 123c to thus install the stator 120 at the base member 110.

The stator 120 and the base member 110 are not completely fixed to each other. That is, the stator 120 is installed at the base member 110 in such a way that the stator 120 can slightly move in a direction perpendicular to the rotation direction of the rotor 130, that is, in a z-axis direction. However, this installation structure is to allow the wave motion of the stator 120. The wave motion of the stator 120 is possible because of the motion of the piezoelectric element 121 expanding and contracting in the z-axis direction.

In the current embodiment, the stator 120 is installed at the base member 110 by using the stator installation member 123, but the invention is not limited thereto. That is, the stator installation structure according to the invention has no special limitation except that the movement of the stator 120 in the rotation direction of the rotor 130 is restricted and simultaneously the stator 120 is allowed to move in the z-axis direction to thus enable the wave motion of the stator 120.

As illustrated in FIG. 2, the rotor 130 has a cylindrical ring shape. The rotor 130, as illustrated in FIG. 4, includes a rotor main body 131, a contact portion 132 extending from the rotor main body 131 toward the stator 120, and an elastic connection portion 133 elastically connecting the rotor main body 131 and the contact portion 132.

The rotor main body 131 supports most of the mass of the rotor 130 and performs a rotation motion by receiving a driving force from the stator 120. The contact portion 132 contacts the operation protrusions 122 of the stator 120. That is, the contact portion 132 contacts the operation protrusions 122 of the stator 120, receives consecutive curved waves from the operation protrusions 122, and converts the received consecutive curved waves into the rotation motion of the rotor 130.

The elastic connection portion 133 elastically connects the rotor main body 131 and the contact portion 132. The structure of the elastic connection portion 133 allows the elastic contact between the contact portion 132 and the operation protrusions 122 and stably maintains the contact by pressing the contact portion 132 against the operation protrusions 122 at an appropriate pressure. Thus, loss in the transfer of power may be prevented, the control of rotation may be made easy, and abrasion due to the friction between parts may be reduced.

Referring to FIGS. 2 and 7, the cover member 140 has a circular ring shape. The cover member 140 includes an inner wall portion 141 and a rim portion 142. A mounting protrusion 141a is formed on the inner wall portion 141. During assembly, as illustrate in FIG. 8, the mounting protrusion 141a of the cover member 140 is inserted in the mounting groove 112a of the base member 110 to install the cover member 140 onto the base member 110.

According to the current embodiment, the mounting protrusion 141a is formed on the inner wall portion 141 of the cover member 140 and the mounting groove 112a is formed on the base member 110, and thus, during assembly, the mounting protrusion 141a is inserted into the mounting groove 112a to install the cover member 140 onto the base member 110. However, the invention is not limited thereto. That is, according to the invention, in a manner opposite to the above-described embodiment, a mounting groove is formed in the inner wall portion 141 of the cover member 140 and a mounting protrusion is formed on the extending portion 112 of the base member 110. Accordingly, during assembly, the mounting protrusion of the base member 110 is inserted in the mounting groove of the cover member 140 to install the cover member 140 onto the base member 110.

The rim portion 142 performs a function of pressing against the pressure control member 170. The pressing operation will be described later with the description of the pressure control member 170. Thus, a detailed description on the pressing operation will be omitted herein.

Four pressure control holes 142a are formed in the rim portion 142. As illustrated in FIGS. 2 and 3, a pressure control bolt 142b that directly presses against the pressure control member 170 is coupled to each of the pressure control holes 142a. When an assembler rotates the pressure control bolt 142b, the pressure control bolt 142b is moved to be closer to or away from the stator 120 so as to push the pressure control member 170 toward the elastic member 160 or to the opposite direction. According to the structure, assembly performance may be improved by finely controlling a pressing force against the rotor 130 according to a degree of the rotation of the pressure control bolt 142b, which will be described later.

Although, in the current embodiment, the pressure control holes 142a are formed at four positions on the rim portion 142 and the pressure control bolt 142b is arranged at each pressure control hole 142a, the invention is not limited thereto. That is, according to the invention, there is no special limit in the number of the pressure control bolt 142b and the pressure control holes 142a formed in the rim portion 142. For example, the number of the pressure control holes 142a and the pressure control bolt 142b may be three or five.

The bearing 150 enables the rotation of the rotor 130 and is arranged between the cover member 140 and the rotor 130. In the current embodiment, a rolling bearing is used as the bearing 150. That is, the bearing 150 includes a first wheel 151, a second wheel 152, a plurality of rolling members 153, and a support member 154.

The first wheel 151 is fixed to the rotor main body 131 and rotates with the rotor 130. The second wheel 152 contacts the elastic member 160 and is arranged to face the first wheel 151. The rolling members 153 are arranged between the first wheel 151 and the second wheel 152 and perform a function of rolling during the operation of the bearing 150. Balls, cylindrical rollers, conic rollers, or needles may be used as the rolling members 153. The support member 154 supports the rolling members 153 and maintains constant distances between the rolling members 153.

Although a rolling bearing is used as the bearing 150 of the current embodiment, the invention is not limited thereto. That is, the bearing according to the invention may use a journal bearing.

The elastic member 160 of the current embodiment, as illustrated in FIGS. 2-4, is arranged between the cover member 140 and the bearing 150 and presses the rotor 130 against the stator 120. The elastic member 160, as illustrated in FIG. 2, has a circular ring shape and is of a leaf spring type.

Although, in the current embodiment, the elastic member 160 has a circular ring shape and is of a leaf spring type, the invention is not limited thereto. That is, the elastic member 160 according to the invention has no special limit in the shape or type, except that the elastic member can press the rotor 130 against the stator 120.

The pressure control member 170 is arranged between the elastic member 160 and the cover member 140. As illustrated in FIG. 2, the pressure control member 170 has a circular ring shape having a predetermined thickness. The pressure control member 170 performs a function of controlling a pressing force to press the rotor 130. That is, the pressure control member 170 has a predetermined thickness, and the elastic member 160 is further pressed by the existence of the pressure control member 170 and thus the pressing force may be controlled. A designer may control the amount of a pressing force applied to the rotor 130 by the number of the pressure control member 170. That is, when a designer wishes to have a large pressing force, a large number of the pressure control member 170 is arranged. When the designer wishes to have a small pressing force, a small number of the pressure control member 170 is arranged, or no pressure control member may be arranged. When the pressure control member 170 is not arranged at all, the cover member 140 is designed to directly contact the elastic member 160.

Although in the current embodiment a single pressure control member 170 is employed, the invention is not limited thereto. That is, the designer may adjust the number of the pressure control member 170 to be employed according to the required amount of a pressing force.

According to the current embodiment, the relatively fine control of a pressing force is performed by using the pressure control bolt 142b, and the general control of a pressing force is performed by the number of the pressure control member 170. That is, a designer or assembler calculates in advance the amount of a pressing force to be applied to the rotor 130, determines the number of the pressure control member 170, and arranges the pressure control member 170 between the cover member 140 and the bearing 150 during assembly. When a fine pressing force is additionally needed after the pressure control member 170 is arranged, the pressure control bolt 142b is rotated to move the pressure control member 170 toward the elastic member 160 or in the opposite direction, thereby performing a fine control of a pressing force.

According to the current embodiment, the pressure control holes 142a are formed in the rim portion 142 of the cover member 140, and the pressure control bolt 142b is coupled to each of the pressure control holes 142a. However, the invention is not limited thereto. That is, a piezoelectric motor according to the invention may not include the pressure control holes 142a and the pressure control bolt 142b.

The overall structure of the piezoelectric motor 100 according to the current embodiment will be described below with reference to the above-described constituent elements and the accompanying drawings.

The stator 120 is arranged on the base member 110, and the contact portion 132 is arranged on the operation protrusions 122 of the stator 120. Also, the first wheel 151 of the bearing 150 is fixedly installed on an inner surface of the rotor main body 131, and the elastic member 160 is arranged on an upper surface of the second wheel 152 of the bearing 150. The pressure control member 170 is arranged on and above an upper surface of the elastic member 160, and the rim portion 142 of the cover member 140 is disposed above the pressure control member 170. The mounting protrusion 141a of the cover member 140 is inserted in the mounting groove 112a of the base member 110 to fixedly install the cover member 140 onto the base member 110.

The pressing force to the rotor 130 is applied by the cover member 140, the pressure control member 170, and the elastic member 160. A designer or assembly may easily control the pressing force to the rotor 130 by adjusting the number of the pressure control member 170 and/or the amount of rotation of the pressure control bolt 142b. Then, the contact portion 132 of the rotor 130 may always contact the operation protrusions 122 of the stator 120 at an appropriate pressing force and thus rotation may be easily controlled, power loss may be decreased, and friction and abrasion between the stator 120 and the rotor 130 may be reduced.

Next, referring to FIGS. 9-11, the operation of the piezoelectric motor 100 according to an embodiment of the invention will be described.

Figure 9:
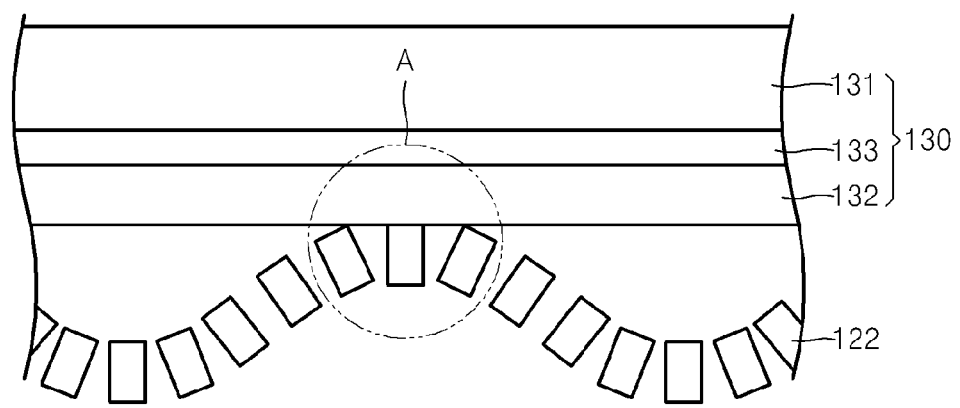
FIG. 9 illustrates a contact operation between operation protrusions of a stator and a rotor according to an embodiment of the invention, in which the other parts except for the operation protrusions of a stator and the rotor are omitted.

FIG. 9 illustrates a contact operation between the operation protrusions 122 of the stator 120 and the rotor 130 according to an embodiment of the invention, in which the other parts except for the operation protrusions 122 of the stator 120 and the rotor 130 are omitted. FIG. 10 is an enlarged view of a portion A of FIG. 9. FIG. 11 is a perspective view schematically illustrating the mutual operation of the operation protrusions 122 and the rotor 130 according to an embodiment of the invention, in which the other parts except for the contact portion 132 of the rotor 130 of the operation protrusions 122 of the stator 120 are omitted.

After a user applies power to the piezoelectric motor 100 and turns a switch on, a driving apparatus (not shown) applies a driving voltage to the piezoelectric element 121. A cosine wave voltage and a sine wave voltage having predetermined frequencies are applied to the piezoelectric element 121 as the driving voltage.

When the driving voltage is applied to the piezoelectric element 121, the polarized portions of the piezoelectric element 121 are expanded and contracted mainly in the z-axis direction according to the frequency of the driving voltage. The expansion and contraction operation of the polarized portions of the piezoelectric element 121 causes consecutive curved waves. As a result, as illustrated in FIG. 9, the rotational force is transferred to the rotor 130 by the contact between the rotor 130 and the operation protrusions 122.

Figure 10:
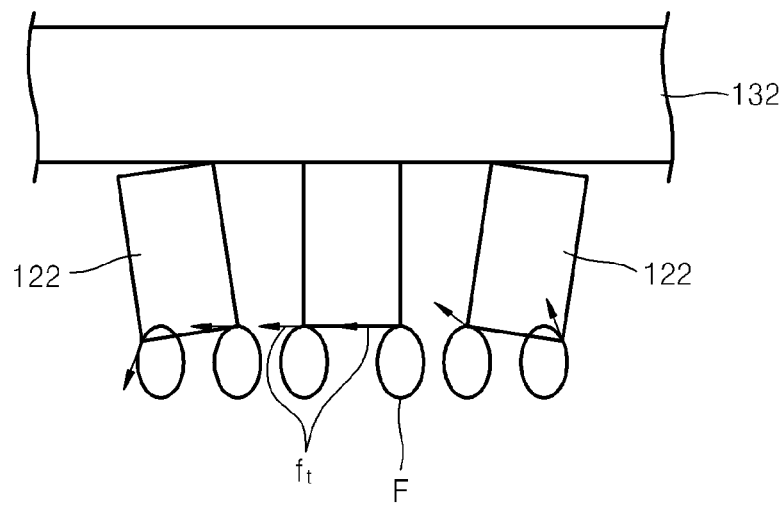
FIG. 10 is an enlarged view of a portion A of FIG. 9.
Figure 11:
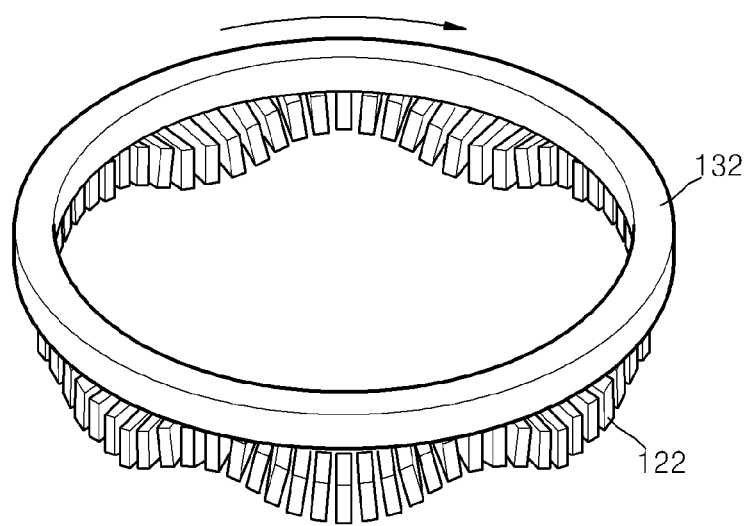
FIG. 11 is a perspective view schematically illustrating a mutual operation of the operation protrusions and the rotor of FIG. 9 according to an embodiment of the invention, in which the other parts except for a contact portion of the rotor and the operation protrusions of a stator are omitted.

That is, as illustrated in FIG. 10, a motion trajectory F of the operation protrusions 122 is oval shaped. The operation protrusions 122 transfer the rotational force to the rotor 130 by the movement of the operation protrusions 122 in a tangential direction $f_t$ on the motion trajectory F.

As illustrated in FIG. 10, the curved wave movement of the stator 120 acts on all of the contact portion 132 of the rotor 130. Accordingly, the rotor 130 performs a rotation motion to drive the piezoelectric motor 100.

According to the piezoelectric motor 100 of the current embodiment, according to the structure of the pressure control member 170 and the pressure control bolt 142b, the pressing force of the rotor 130 acting on the stator 120 may be easily controlled as necessary. When the pressing force is appropriately controlled, the rotation of the rotor 130 may be easily controlled, power loss may be decreased, and friction and abrasion may be reduced.

Also, according to the piezoelectric motor 100 of the current embodiment, since the cover member 140 is easily installed onto the base member 110 by using the mounting protrusion 141a and the mounting groove 112a, the number of assembly steps and the manufacturing cost may be reduced.

Also, according to the piezoelectric motor 100 of the current embodiment, since the stator 120 is easily installed onto the base member 110 by using the stator installation member 123, the number of assembly steps and the manufacturing cost may be reduced.

Second Embodiment

Referring to FIGS. 12-18, a piezoelectric motor 200 according to another embodiment of the invention will now be described mainly based on the differences from the piezoelectric motor 100 according to the above-described embodiment of the invention.

Figure 12:
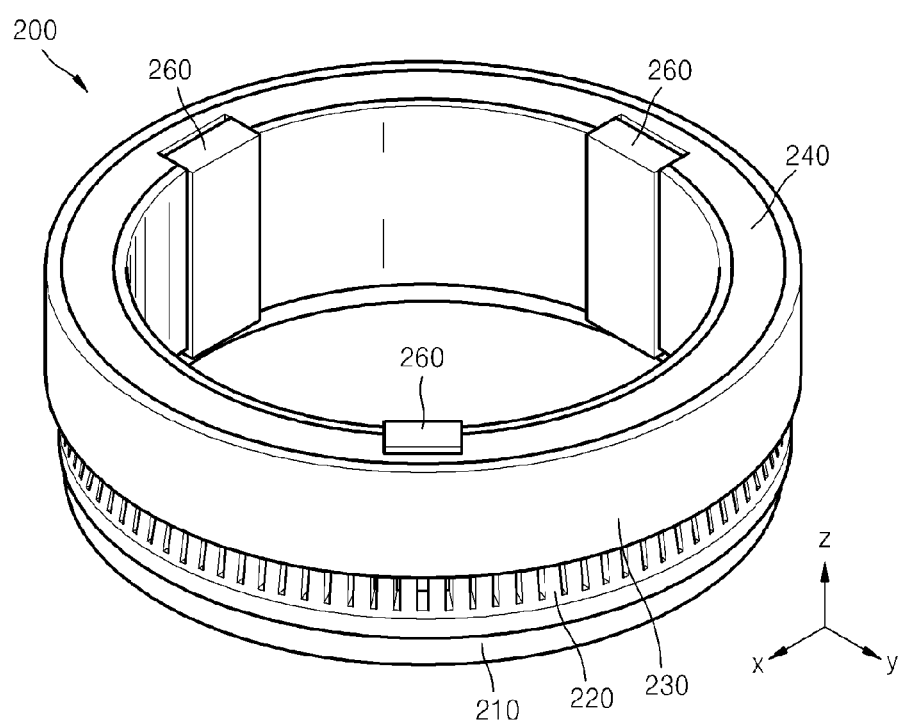
FIG. 12 is a perspective view of a piezoelectric motor according to another embodiment of the invention.
Figure 13:
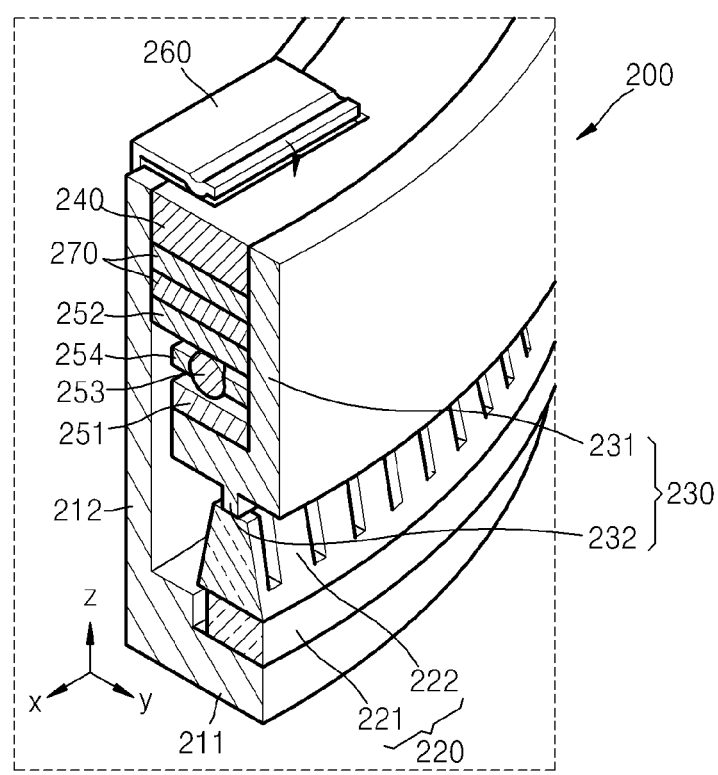
FIG. 13 is an enlarged cross-sectional view of a portion of the piezoelectric motor of FIG. 12.
Figure 14:
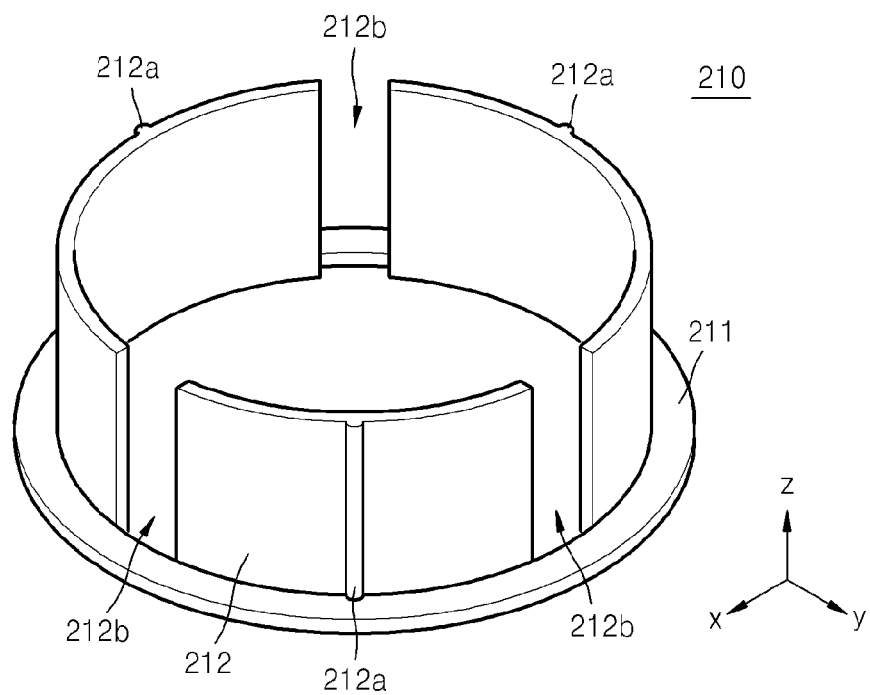
FIG. 14 is a front perspective view of a base member according to another embodiment of the invention.
Figure 15:
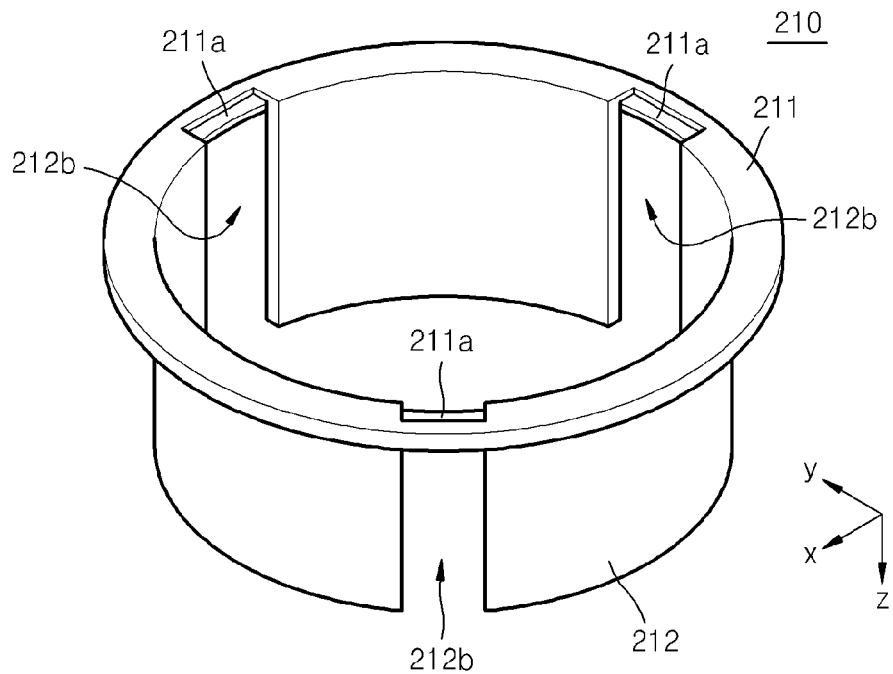
FIG. 15 is a rear perspective view of the base member of FIG. 14.
Figure 16:
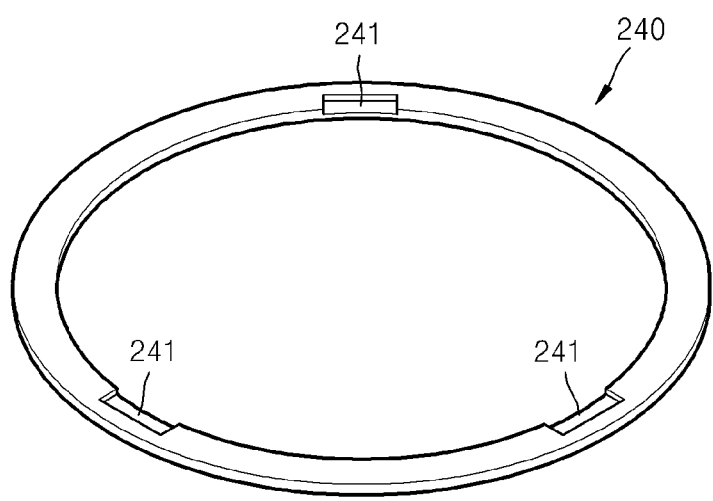
FIG. 16 is a perspective view of a cover member according to another embodiment of the invention.
Figure 17:
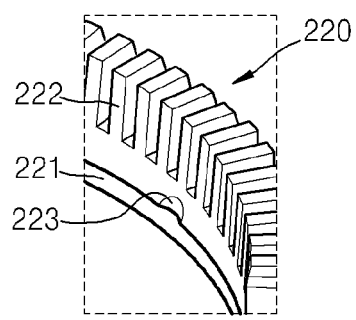
FIG. 17 is a perspective view illustrating a part of a stator according to another embodiment of the invention.
Figure 18:
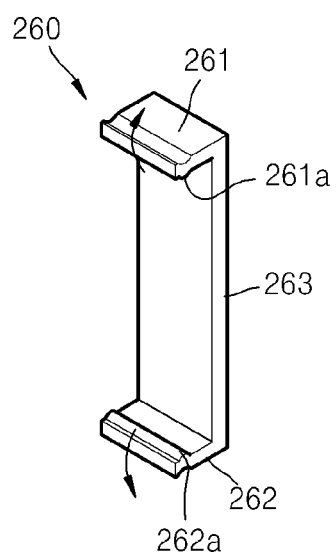
FIG. 18 is a perspective view of an elastic member according to another embodiment of the invention.

FIG. 12 is a perspective view of the piezoelectric motor 200 according to another embodiment of the invention. FIG. 13 is an enlarged cross-sectional view of a portion of the piezoelectric motor 200 of FIG. 12. FIG. 14 is a front perspective view of a base member 210 according to the current embodiment. FIG. 15 is a rear perspective view of the base member 210 of FIG. 14. FIG. 16 is a perspective view of a cover member 240 according to the current embodiment. FIG. 17 is a perspective view illustrating a part of a stator 220 according to the current embodiment. FIG. 18 is a perspective view of one of a plurality of elastic members 260 according to the current embodiment.

As illustrated in FIGS. 12 and 13, the piezoelectric motor 200 according to the current embodiment includes the base member 210, the stator 220, a rotor 230, the cover member 240, a bearing 250, the elastic members 260, and a plurality of pressure control members 270.

As illustrated in FIGS. 12, 14, and 15, the base member 210 has a circular ring shape. The base member 210 includes a support portion 211 where the stator 220 is arranged and an extension portion 212 extending from the support portion 211 toward the cover member 240.

As illustrated in FIG. 15, a first installation groove 211a is formed in a rear surface of the support portion 211, in which one end of each of the elastic members 260 is inserted. Three coupling protrusions 212a are formed on the extension portion 212. The coupling protrusions 212a allow for installation of the stator 220, which will be described in detail later. Also, three opening portions 212b for the installation of the elastic members 260 are formed in the extension portion 212. Parts of the elastic members 260 are located at the opening portions 212b during assembly.

The stator 220 has a circular ring shape. As illustrated in FIG. 17, a piezoelectric element 221 is arranged on one surface of the stator 220, a plurality of operation protrusions 222 are formed on the other surface thereof which is opposite to the surface on which the piezoelectric element 221 is disposed, and a coupling groove 223 is formed in an inner circumferential surface thereof.

Since the shape, type, and polarization state of the piezoelectric element 221 are the same as those of the piezoelectric element 121 of the above-described embodiment, a detailed description thereof will be omitted herein. The operation protrusions 222 of the stator 220 protrude toward the rotor 230 and form a contact friction surface between the stator 220 and the rotor 230.

The stator 220 is installed onto the base member 210. In the current embodiment, the stator 220 is installed onto the base member 210 by using the coupling groove 223 formed in the inner circumferential surface of the stator 220 and the coupling protrusions 212a of the base member 210. That is, as each of the coupling protrusions 212a of the base member 210 is inserted in the coupling groove 223 of the stator 220, the stator 220 is installed onto the base member 210.

The stator 220 and the base member 210 are not completely fixed to each other. That is, as each of the coupling protrusions 212a of the base member 210 is coupled to the coupling groove 223 of the stator 220 while being capable of sliding, the stator 220 is installed onto the base member 210 while being capable of moving a predetermined distance in a direction perpendicular to the rotation direction of the rotor 230, that is, the z-axis direction. This structure allows the rotor 230 to be rotated, by embodying the wave motion of the stator 220, as described above in the above-described embodiment.

In the current embodiment, the coupling groove 223 is formed in the inner circumferential surface of the stator 220 and the coupling protrusions 212a are formed on the base member 210, each of the coupling protrusions 212a is coupled to the coupling groove 223 to install the stator 220 onto the base member 210. However, the invention is not limited thereto. That is, according to the invention, in a manner opposite to the description above, coupling protrusions are formed on the inner circumferential surface of the stator 220 and a coupling groove is formed in the base member 210 and then the coupling protrusions are coupled to the coupling groove to install the stator 220 onto the base member 210.

The rotor 230 has a circular ring shape. The rotor 230 includes a rotor main body 231 and a contact portion 232 extending from the rotor main body 231 toward the stator 220. The rotor main body 231 is a part that takes most of mass of the rotor 230 and performs a rotation motion by receiving power from the stator 220.

The contact portion 232 is a portion that contacts the operation protrusions 222 of the stator 220. That is, the contact portion 232 contacts the operation protrusions 222 of the stator 220 and receives consecutive curved waves from the operation protrusions 222 and performs a function to convert the consecutive curved waves into the rotation motion of the rotor 230.

The cover member 240 has a circular ring shape and performs a function of pressing against the pressure control members 270. Since the pressing operation will be described with the description on the pressure control members 270, a detailed description of which is omitted herein.

The cover member 240 is installed onto the base member 210. To this end, as illustrated in FIG. 16, second installation grooves 241 in which the elastic members 260 are inserted and fixed are formed in the cover member 240.

The bearing 250 facilitates the rotation of the rotor 230 and is arranged between the cover member 240 and the rotor 230. A rolling bearing is used for the bearing 250 according to the current embodiment. The bearing 250 includes a first wheel 251, a second wheel 252, a plurality of rolling members 253, and a support member 254.

The first wheel 251 is fixed to the rotor main body 231 and rotates with the rotor 230. The second wheel 252 contacts the pressure control member 270 and is arranged to face the first wheel 251. The rolling members 253 are arranged between the first wheel 251 and the second wheel 252 and a function of rolling during the operation of the bearing 250. Balls, cylindrical rollers, conic rollers, or needles may be used as the rolling members 253. The support member 254 supports the rolling member 253 and maintains constant distances between the rolling members 253.

The elastic members 260 install the cover member 240 onto the base member 210 in an elastic manner. As illustrated in FIG. 18, the elastic members 260 have a shape of "Π" and are arranged at three positions to correspond to the opening portions 212b of the base member 210.

According to the current embodiment, three elastic members 260 are installed with an interval of 120° between each thereof, but the invention is not limited thereto. That is, according to the invention, there is no limit in the number of the elastic members and also in the arrangement shape. However, it is preferable that the elastic members are symmetrically arranged to provide a uniform pressing force to the rotor 230 over all of the piezoelectric motor 200.

Each of the elastic members 260 includes a cover member installation portion 261, a base member installation portion 262, and a middle portion 263. The cover member installation portion 261 is a part to be inserted in each of the second installation grooves 241 of the cover member 240. An installation protrusion 261a to prevent slippage and provide an elastic force is formed on an inner surface of the cover member installation portion 261.

The base member installation portion 262 is a part to be inserted in the first installation groove 211a of the base member 210. An installation protrusion 262a to prevent slippage and provide an elastic force is formed on an inner surface of the base member installation portion 262. The middle portion 263 is a part to connect the cover member installation portion 261 and the base member installation portion 262.

The elastic member 260 installs the cover member 240 onto the base member 210, and simultaneously, presses against the cover member 240 so as to press against the pressure control member 270 and the rotor 230 toward the stator 220. The operation of a pressing force will be described later with the description of the pressure control member 270.

The elastic members 260 of the current embodiment have a shape of "Π", but the invention is not limited thereto. That is, there is no special limit in the shape or type of an elastic member according to the invention as long as the elastic member presses against the cover member 240 so as to press against the rotor 230 toward the stator 220.

Although the installation protrusions 261a and 262a are formed on the cover member installation portion 261 and the base member installation portion 262 of the elastic member 260 of the current embodiment, the invention is not limited thereto. That is, the installation protrusions 261a and 262a may not be formed on the cover member installation portion 261 and the base member installation portion 262 of the elastic member 260 of the current embodiment, and an installation protrusion may be formed on any one of the cover member installation portion 261 and the base member installation portion 262. When the installation protrusions 261a and 262a are not formed, by configuring the distance between end portions of the cover member installation portion 261 and the base member installation portion 262 to be relatively shorter than that when the installation protrusions 261a and 262a are formed, a required elastic force may be implemented.

Two pressure control members 270 are arranged between the cover member 240 and the bearing 250. The pressure control members 270 have a circular ring shape having a predetermined thickness.

The pressure control members 270 control a pressing force for pressing against the rotor 230. That is, since the pressure control members 270 have a predetermined thickness, the rotor 230 is further pressed due to the existence of the pressure control members 270 and thus a pressing force may be controlled. A designer by adjusting the number of the pressure control members 270 may control the amount of the pressing force applied to the rotor 230. That is, when a large pressing force is desired, the designer may arrange a large number of the pressure control members 270. When a small pressing force is desired, a less number of the pressure control members 270 may be arranged or no pressure control member may be arranged. When no pressure control member is arranged, the cover member 240 directly contacts the second wheel 252 of the bearing 250.

Although in the current embodiment two pressure control members 270 are arranged, the invention is not limited thereto. That is, as described above, the number of the pressure control members 270 to be applied may be controlled according to the required amount of a pressing force.

The overall structure of the piezoelectric motor 200 of the current embodiment will be described below with respect to the respective constituent elements. Referring to the respective above-described constituent elements and drawings, the overall structure of the piezoelectric motor 200 of the current embodiment will be described below.

The stator 220 is arranged on the base member 210. The contact portion 232 of the rotor 230 is arranged on the operation protrusions 222 of the stator 220. Also, the first wheel 251 of the bearing 250 is fixed to an inner surface of the rotor main body 231. The two pressure control members 270 are arranged on an upper surface of the second wheel 252 of the bearing 250. The cover member 240 is located on an upper surface of the pressure control members 270.

The cover member installation portion 261 of the elastic member 260 is inserted in each of the second installation grooves 241 of the cover member 240 and the base member installation portion 262 is inserted in the first installation groove 211a of the base member 210 and fixed thereto, and thus the cover member 240 is installed at the base member 210. When the cover member installation portion 261 is inserted in each of the second installation grooves 241 and the base member installation portion 262 is inserted in the first installation groove 211a, elastic bending is generated by the structures of the installation protrusions 261a and 262a, which protrude inwardly, in directions indicated by arrows of FIG. 18. As the elastic bending is generated, an elastic force is applied in a direction to decrease the distance between the cover member installation portion 261 and the base member installation portion 262 after the elastic member 260 is installed. Due to the application of the elastic force, the elastic member 260 presses against an upper surface of the cover member 240 and thus the rotor 230 is pressed at a predetermined pressure.

That is, the elastic force by the elastic member 260 presses against the rotor 230 sequentially via the cover member 240, the pressure control member 270, and the bearing 250. A designer or assembler may easily control the pressing force to the rotor 230 by adjusting the number of the pressure control member 270. Then, since the contact portion 232 of the rotor 230 always contacts the operation protrusions 222 of the stator 220 at an appropriate pressure, the rotation of the rotor 230 may be easily controlled, power loss may be decreased, and friction and abrasion between the stator 220 and the rotor 230 may be reduced.

Since the structure, operation, and effect of the piezoelectric motor 200 according to the current embodiment other than those described above are similar as those of the piezoelectric motor 100 of the above-described embodiment, the detailed descriptions thereon will be omitted herein.

According to the piezoelectric motor 200 of the current embodiment, according to the structure of the pressure control member 270, the pressing force of the rotor 230 acting on the stator 220 may be easily controlled as necessary. When the pressing force is appropriately controlled, the rotation of the rotor 230 may be easily controlled, power loss may be decreased, and friction and abrasion may be reduced.

Also, according to the piezoelectric motor 200 of the current embodiment, since the cover member 240 is easily installed onto the base member 210 by using the elastic member 260, the number of assembly steps and the manufacturing cost may be reduced.

Also, according to the piezoelectric motor 200 of the current embodiment, since the stator 220 is easily installed onto the base member 210 as each of the coupling protrusions 212a of the base member 210 is inserted in the coupling groove 223 of the stator 220, the number of assembly steps and the manufacturing cost may be reduced.

As described above, a piezoelectric motor having improved performance may be embodied.

In the description above, the term formed has been used to describe physical shapes of members of the piezoelectric motor. Formed should be understood to mean that a single piece may formed into a shape or that multiple pieces may be joined together to achieve the desired shape.

While the invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A piezoelectric motor comprising:
a base member;
a stator disposed on the base member and comprising at least one piezoelectric element;
a rotor configured to rotate by a wave motion of the stator, the wave motion being generated by the piezoelectric element,
a cover member attached to the base member;
a bearing arranged between the cover member and the rotor;
an elastic member configured to press the rotor toward the stator; and
a stator installation member for attaching the stator onto the base member,
wherein a plurality of operation protrusions are formed on the stator, and wherein a part of the stator installation member is inserted in a space between the operation protrusions, and the other part of the stator installation member is fixed to the base member.

2. The piezoelectric motor of claim 1, wherein a plurality of operation protrusions are formed on the stator and a part of the rotor is configured to contact the operation protrusions.

3. The piezoelectric motor of claim 1, wherein a coupling groove is formed in the stator and a coupling protrusion formed on the base member is configured to couple with the coupling groove.

4. The piezoelectric motor of claim 1, wherein a coupling protrusion is formed on the stator and a coupling groove formed in the base member is configured to couple with the coupling protrusion.

5. The piezoelectric motor of claim 1, wherein a mounting groove is formed in the base member and a mounting protrusion formed on the cover member is configured to couple to the mounting groove.

6. The piezoelectric motor of claim 1, wherein a mounting groove is formed in the cover member and a mounting protrusion formed on the base member is configured to couple with the mounting groove.

7. The piezoelectric motor of claim 1, wherein at least one pressure control member is arranged between the cover member and the bearing.

8. The piezoelectric motor of claim 7, wherein at least one pressure control hole is formed in the cover member and a pressure control bolt is installed in the pressure control hole.

9. The piezoelectric motor of claim 1, wherein the elastic member is arranged between the cover member and the bearing.

10. The piezoelectric motor of claim 9, wherein the elastic member is a leaf spring having a ring shape.

11. The piezoelectric motor of claim 1, wherein the elastic member comprises:
   a cover member installation portion configured to be installed onto the cover member;
   a base member installation portion configured to be installed onto the base member; and
   a middle portion configured to connect the cover member installation portion with the base member installation portion.

12. The piezoelectric motor of claim 11, wherein the cover member installation portion and the base member installation portion are configured to elastically deform during installation of the elastic member, and wherein the elastic member is configured to operate an elastic force in a direction to decrease the distance between the cover member installation portion and the base member installation portion.

13. The piezoelectric motor of claim 11, wherein an installation protrusion is formed on at least one of the cover member installation portion and the base member installation portion.

14. The piezoelectric motor of claim 1, wherein the base member has a circular ring shape.

15. A piezoelectric motor comprising:
   a base member comprising a cover member;
   a stator disposed on the base member and comprising at least one piezoelectric element;
   a rotor configured to rotate by a wave motion of the stator, the wave motion being generated by the piezoelectric element;
   a bearing arranged between the cover member and the rotor;
   an elastic member configured to urge the rotor toward the stator; and
   a stator installation member for attaching the stator onto the base member,
   wherein a plurality of operation protrusions are formed on the stator, and wherein a part of the stator installation member is inserted in a space between the operation protrusions, and the other part of the stator installation member is fixed to the base member.

16. The piezoelectric motor of claim 14, wherein the cover member is installed onto the base member.

17. A method of rotating a rotor of a piezoelectric motor, the method comprising:
   applying power to the piezoelectric motor;
   applying a cosine wave voltage and a sine wave voltage having predetermined frequencies as a drive voltage to a piezoelectric element supported by a base member, thereby causing the piezoelectric element to move in a wave motion;
   pressing the rotor towards the piezoelectric element with the force from an elastic member, wherein the force acts between a cover member above the base and the base and wherein the force presses a bearing arranged between the cover member and the base, and wherein the bearing rotates in response to the rotor rotating.

18. The method of claim 17, wherein the piezoelectric element is a circular ring shape.

* * * * *